United States Patent
Chua et al.

(10) Patent No.: US 9,517,674 B2
(45) Date of Patent: Dec. 13, 2016

(54) PNEUMATIC CONTROL SYSTEM FOR A HEAVY-DUTY VEHICLE

(71) Applicant: HENDRICKSON USA, LLC, Itasca, IL (US)

(72) Inventors: Bun-Hiong Chua, Naperville, IL (US); Anthony Joseph Bills, Romeoville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/746,903

(22) Filed: Jun. 23, 2015

(65) Prior Publication Data

US 2015/0367704 A1  Dec. 24, 2015

Related U.S. Application Data

(60) Provisional application No. 62/016,157, filed on Jun. 24, 2014.

(51) Int. Cl.
*B60G 17/04* (2006.01)
*B60G 17/052* (2006.01)
*B60G 11/27* (2006.01)
*B60G 17/033* (2006.01)

(52) U.S. Cl.
CPC ........... *B60G 17/0525* (2013.01); *B60G 11/27* (2013.01); *B60G 17/033* (2013.01); *B60G 17/0521* (2013.01); *B60G 2202/152* (2013.01); *B60G 2500/30* (2013.01)

(58) Field of Classification Search
CPC ..................... B60G 17/0525; B60G 2202/152; B60G 2500/30; B60G 2300/38

USPC ....................................................... 280/6.157
See application file for complete search history.

(56) References Cited

U.S. PATENT DOCUMENTS

| | | | |
|---|---|---|---|
| 2,967,064 A | 1/1961 | Valentine | |
| 3,442,502 A | 5/1969 | Fischer et al. | |
| 5,273,308 A | 12/1993 | Griffiths | |
| 5,472,227 A | 12/1995 | Schonfeld et al. | |
| 6,308,973 B1 * | 10/2001 | Griebel ..................... | B60G 9/02 |
| | | | 280/124.158 |
| 6,412,789 B1 | 7/2002 | Pierce et al. | |
| 7,621,537 B2 | 11/2009 | Pierce et al. | |
| 7,841,608 B2 | 11/2010 | Morris et al. | |
| 8,047,551 B2 | 11/2011 | Morris et al. | |

(Continued)

FOREIGN PATENT DOCUMENTS

EP        1484203 A2    12/2004

*Primary Examiner* — James English
(74) *Attorney, Agent, or Firm* — Dureska & Moore, LLC; David P. Dureska; Brent L. Moore

(57) ABSTRACT

A pneumatic control system for a heavy-duty vehicle includes an air supply in fluid communication with a height control valve and an air spring. An air lock valve is in fluid communication with the height control valve and the air spring, and is also in fluid communication with a blank cavity. The air lock valve includes an "air lock off" position and an "air lock on" position. When the air lock valve is in the "air lock off" position, fluid flows from the height control valve, through the air lock valve to the air spring. When the air lock valve is in the "air lock on" position, fluid communication between the air spring, the air lock valve and the height control valve is prevented and, instead, fluid flows from the air spring, through the air lock valve to the blank cavity.

15 Claims, 12 Drawing Sheets

(56) References Cited

U.S. PATENT DOCUMENTS

| | | | |
|---|---|---|---|
| 8,973,922 B2* | 3/2015 | Koelzer | F16K 11/0525 137/625.6 |
| 2002/0096840 A1* | 7/2002 | Sulzyc | B60G 17/0185 280/5.514 |
| 2003/0000587 A1 | 1/2003 | Sulzye et al. | |
| 2005/0040573 A1 | 2/2005 | Bolt et al. | |
| 2007/0102895 A1* | 5/2007 | Pierce | B60G 9/003 280/124.16 |
| 2009/0194179 A1 | 8/2009 | Morris et al. | |

* cited by examiner

PNEUMATIC CONTROL SYSTEM FOR A HEAVY-DUTY VEHICLE

CROSS-REFERENCE TO RELATED APPLICATION

This application claims the benefit of U.S. Provisional Patent Application Ser. No. 62/016,157, filed Jun. 24, 2014.

BACKGROUND OF THE INVENTION

Field of the Invention

The invention relates generally to the art of air-ride axle suspension systems for heavy-duty vehicles, such as tractor-trailers or semi-trailers, and utility trucks, which cushion the ride and stabilize the vehicle during operation. More specifically, the invention relates to a pneumatic control system that is utilized in conjunction with a height control valve for a heavy-duty vehicle air-ride axle/suspension system, which includes an air lock/retention function that maintains a volume of air in the air springs during certain operations, such as an outrigger deployment/retraction operation for a utility truck or placement of a trailer onto a rail flatbed, that would otherwise typically cause the air springs to become completely extended and/or exhausted.

Background Art

Heavy-duty vehicles, such as tractor-trailers or semi-trailers, fire/rescue, and utility vehicles, such as landscape, boom trucks, and the like, may include air-ride axle/suspension systems, which use air springs to cushion the ride of the vehicle. Pneumatic control of these air springs is an important feature of air-ride axle/suspension systems.

Heavy-duty vehicles utilize air-ride axle/suspension systems to reduce the possibility of damage to and extend the service life of the truck and the components of the truck, such as hydraulic components, electric components and the fabricated bodies of the truck. More specifically, air-ride axle/suspension systems provide a smoother ride to the vehicle thereby reducing vibrations imparted to the hydraulic components, electronic components, and fabricated body of the vehicle during operation, resulting in reduced potential for damage to the components and increased component life.

More particularly, it is important for a cushioned vehicle ride, and for optimum axle/suspension system performance and longevity, to attempt to maintain a consistent, predetermined distance between the vehicle frame and the travel surface. This predetermined distance is known in the art as the design ride height of a vehicle. The operating conditions of the vehicle must be considered in order to establish the design ride height of a vehicle. That is, when a heavy-duty vehicle executes certain maneuvers, such as making a hard turn or traveling over rough terrain, the forces imposed on the axle/suspension system by such maneuver cause the axle/suspension system to articulate, or pivot and/or flex beneath the vehicle frame which the system supports. Typically, an axle/suspension system is designed so that the anticipated range of articulation, pivoting and/or flexing occurs about a nominal predetermined position, and that nominal position is set as the design ride height of the vehicle.

When a heavy-duty vehicle, such as the trailer of a semi-trailer, is loaded, the air springs are adjusted to ensure that the vehicle is at design ride height while traveling. The pneumatic control or adjustment of the air springs of the axle/suspension system is typically accomplished by a height control valve or leveling valve which is in fluid communication with an air source and with the air springs. When the heavy-duty vehicle is loaded with freight and the air springs of an axle/suspension system are compressed causing the vehicle frame to be positioned below design ride height or closer to the travel surface, compressed air is supplied to the air springs thereby inflating/extending them and, in turn, causing the axle/suspension system to raise the vehicle frame to the design ride height. Conversely, when the vehicle is unloaded and the air springs of the axle/suspension system are extended causing the vehicle frame to be positioned above design ride height or further away from the travel surface, air is exhausted from the air springs reducing the internal pressure of the air springs, thereby deflating/compressing them until the axle/suspension system lowers the vehicle frame to the design ride height. As set forth above, the adjustment of the air springs, including regulation of airflow into the air springs and the exhaustion of air from the air springs, is controlled by a mechanically operated valve known in the art as a height control valve. Adjustments to the height control valve and the linkage that controls activation of the height control valve enable the design ride height to be achieved before the vehicle travels.

As the vehicle travels and the driver executes maneuvers that cause the axle/suspension system to articulate between a position that compresses the air springs and a position that extends them, the height control valve automatically acts to maintain the design ride height. That is, when the air springs are compressed, the height control valve causes air to be supplied to the air springs from a vehicle air reservoir or air tank. Conversely, when the air springs are in an extended position, the height control valve causes air to be exhausted from the air springs to atmosphere. The amount of air that is supplied or exhausted to and from the air springs by the height control valve is based on the duration of the articulation of the suspension beam and the flow rate of the height control valve at a given position.

Certain operating events can cause the axle/suspension system of the vehicle to become completely extended, resulting in complete exhaustion and/or deflation of the air spring by the height control valve. Two such events are commonly known in the industry. The first event occurs when a trailer of a tractor-trailer having an air-ride axle/suspension system is lifted by a crane onto a flatbed rail car. When this occurs, the air springs of the axle/suspension system of the trailer become completely extended as the trailer is lifted off of the ground and the tires lose contact with the travel surface. The second commonly known event occurs when a utility truck having outriggers, such as a landscape truck with a telescopic boom, and having an air-ride axle/suspension system, deploys the outriggers during operation of the vehicle to stabilize the base of the vehicle to prevent rollover. During outrigger operation, the outriggers raise the utility truck until the tires are disengaged from the travel surface, thereby causing complete extension of the air springs of the axle/suspension system. In both events, as the air springs become extended, the height control valve automatically exhausts air from the air springs in order to attempt to return the axle/suspension system to design ride height. However, because the air springs are extended due to an external force, i.e. the outriggers or the crane lifting the trailer off of the ground, exhaustion of the air spring by the height control valve does not return the vehicle to design ride height but rather can potentially create a vacuum in the air bag or flexible member of the air spring, thereby collapsing the air bag inwardly onto itself. When this occurs and when the axle/suspension system is lowered back onto the ground by the outrigger or the crane, the air bag of the air spring can become pinched or trapped between the internal bumper and the upper bead plate of the air spring, resulting in potential damage to the air bag of the air spring. As air pressure is reintroduced into the air springs, the air bag of the air spring can remain pinched, so that when the vehicle encounters a bump, the bag can pop out violently from its pinched state, possibly causing damage to the air bag or air spring piston. In addition, once the air springs have become completely exhausted during one of the lifting maneuvers, it takes longer for the pneumatic control system to re-inflate the air springs in order to return the vehicle to design ride height.

In addition, other operating events can cause increased fore-aft movement of the vehicle, or dock walk. For example, typical trailing beam air suspensions produce dock walk when brakes are applied and suspension travels through jounce and rebound. More specifically, dock walk is defined as fore-aft movement of the chassis caused by the rotation of the tires relative to the ground during suspension travel with brakes locked. Jounce/rebound travel, associated with dock walk, may be caused by mechanical systems, such as outrigger operations, or by air control systems, such as dump valves or overinflate valves. Dock walk can cause high stress on structural components.

Therefore, a need exists in the art for a pneumatic control system that minimizes the possibility of damage to the air bags, or other components, of the air springs by limiting the amount of air or fluid that is exhausted from the air springs during outrigger operations, trailer placement onto a flatbed rail car, and/or other instances when the air springs become completely extended and/or exhausted. Additionally, a need exists in the art for a pneumatic control system that minimizes the fore-aft movement of the vehicle during outrigger retraction operations.

The pneumatic control system of the present invention solves the problems associated with prior art pneumatic control systems by providing a pneumatic control system that locks and/or retains air volume within the air springs during outrigger operation, trailer placement onto a flatbed rail car, or other instances when the air springs of the axle/suspension system of the vehicle are completely extended and/or exhausted during operation and also during outrigger retraction operations.

SUMMARY OF THE INVENTION

Objectives of the present invention include providing a pneumatic control system for a heavy-duty vehicle that retains air volume within the air springs during outrigger operation, trailer placement onto a flatbed rail car, or other instance where the air springs of the axle/suspension system of the vehicle are completely extended and/or exhausted.

A further objective of the present invention is to provide a pneumatic control system for a heavy-duty vehicle that minimizes the fore-aft movement of the vehicle during outrigger retraction operations.

These objectives and advantages are obtained by the pneumatic control system for a heavy-duty vehicle of the present invention comprising: a) an air supply; b) a height control valve in fluid communication with the air supply and at least one air spring; c) an air lock valve in fluid communication with the height control valve and the at least one air spring, the air lock valve being in fluid communication with a blank cavity, the air lock valve having an "air lock off" position and an "air lock on" position; d) whereby, when the air lock valve is in the "air lock off" position, fluid flow is established between the height control valve, the air lock valve and the at least one air spring, and when the air lock valve is in the "air lock on" position, fluid flow is established between the at least one air spring, the air lock valve and the blank cavity, and fluid flow is prevented between the height control valve, the air lock valve and the at least one air spring.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
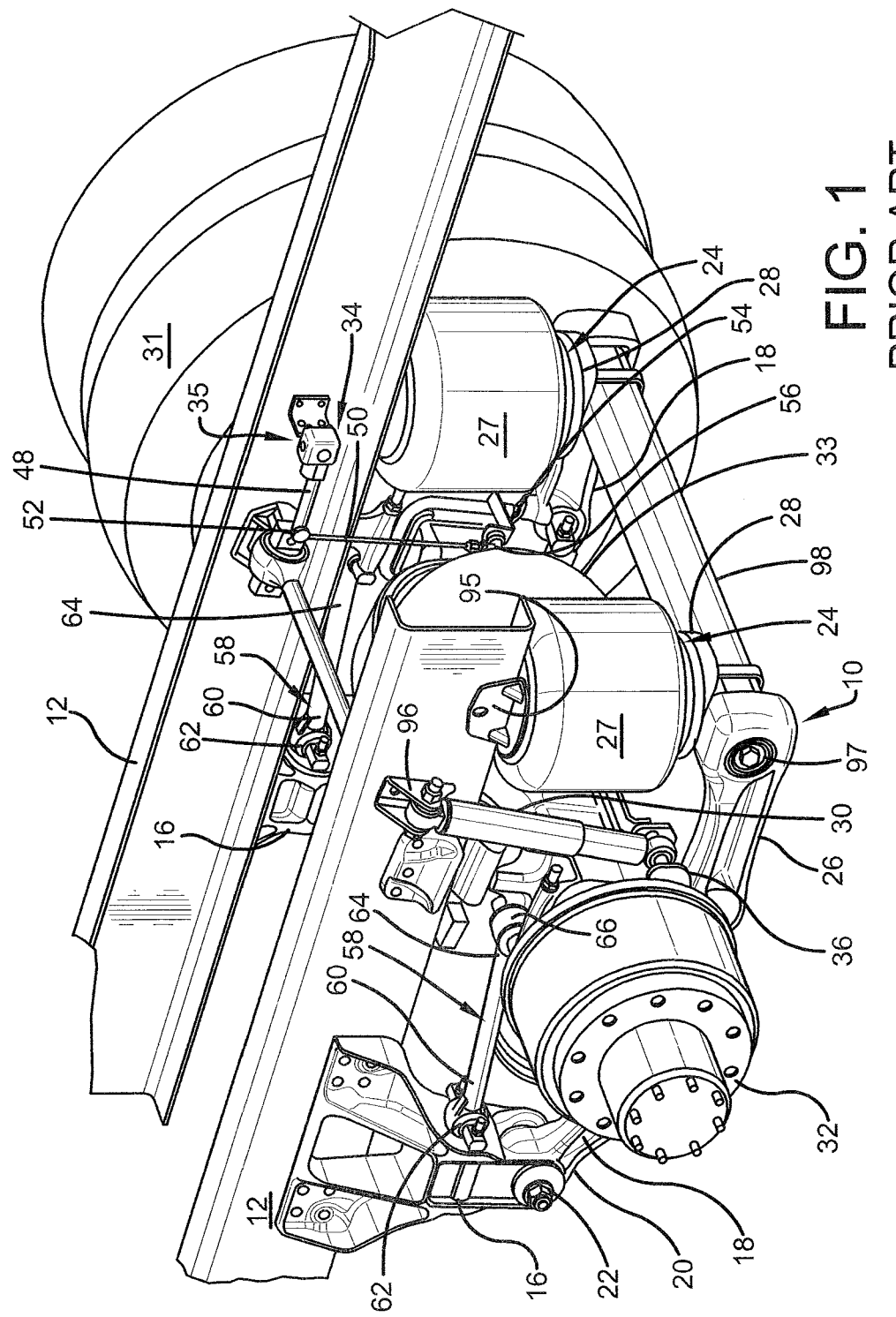
FIG. 1 is a fragmentary perspective view of portions of an axle/suspension system for a heavy-duty truck incorporating a prior art pneumatic control system, showing the height control valve mounted on the vehicle frame and operatively connected to the axle/suspension system.

In order to better understand the environment in which the pneumatic control system with air lock/retention functionality of the present invention is utilized, a trailing arm air-ride truck axle/suspension system 10 that incorporates a prior art pneumatic control system 35 is shown in FIG. 1 and will now be described in detail below.

FIG. 1 illustrates components used in association with a vehicle, such as a heavy-duty truck and the like (not shown). The vehicle includes longitudinally extending frame rails 12 positioned on opposite sides of the vehicle and having a preferred C-shaped configuration. The vehicle further includes a drive axle (not shown) contained within a housing 33 that extends transverse to frame rails 12. A wheel end 32 is mounted on each end of the drive axle. Wheels 31 (only a single pair shown) are mounted on respective wheel ends 32 and are driven by a vehicle engine (not shown).

Truck axle/suspension system 10 connects drive axle housing 33 to frame rails 12 positioned on opposite sides of the vehicle. As will be appreciated, with respect to truck axle/suspension system 10, the majority of the components positioned on one side of the vehicle will have correspondingly similar components positioned on the other side of the vehicle. Accordingly, in this description, when reference is made to a particular axle/suspension system component, it will be understood that a similar component is present on the opposite side of the vehicle, unless otherwise apparent.

Truck axle/suspension system 10 includes a plurality of components including a pair of frame hangers 16 each mounted on opposite sides of the vehicle to a respective one of frame rails 12. Truck axle/suspension system 10 further includes longitudinally extending main beams 18 each pivotally connected at a front end 20 to its respective frame hanger 16 via a bushing 22. At a rear end 26 of beam 18, each one of the beams is connected to a laterally extending crossbrace 98 by way of crossbrace-to-beam connection 97. As shown, a single crossbrace is utilized for each axle using truck axle/suspension system 10. As such, crossbrace 98 extends laterally across the vehicle to connect with the rearward ends of beams 18 positioned on opposite sides of the vehicle.

Each beam 18 includes an axle pivot bore formed in a generally central portion of the beam (not shown), which permits an axle clamp assembly 36 to connect drive axle housing 33 to each beam 18 for pivotal movement of the beam. Each one of a pair of longitudinal control members 58 is pivotally connected at a junction 62 to its respective hanger 16 at a front end 60. A rear end 64 of each longitudinal control member 58 is pivotally connected at its respective junction 66 (only one shown) to axle clamp assembly 36. Truck axle/suspension system 10 further includes a shock damper 30 connected at its upper end to an upper shock bracket 96 mounted to frame rail 12 and at its lower end to axle clamp assembly 36. Truck axle/suspension system 10 further includes air springs 24 connected at their respective top ends to an air spring mounting bracket 95 that is in turn mounted to frame rail 12. Air springs 24 include an air bag 27, or flexible member, or the like, commonly referred to in the art as a bellows, and an air spring piston 28. Air springs 24 are positioned on crossbrace 98 in a manner known in the art, such as by being seated on a conventional, suitable air spring mounting pad (not shown) which in turn is mounted on the crossbrace.

Portions of a prior art pneumatic control system 35, including a height control valve 34, are shown mounted on frame 12. Height control valve 34 is pivotally connected to beam 18 via control arm 48, link 50, fastener 52, mounting bracket 54 and fastener 56.

Figure 2:
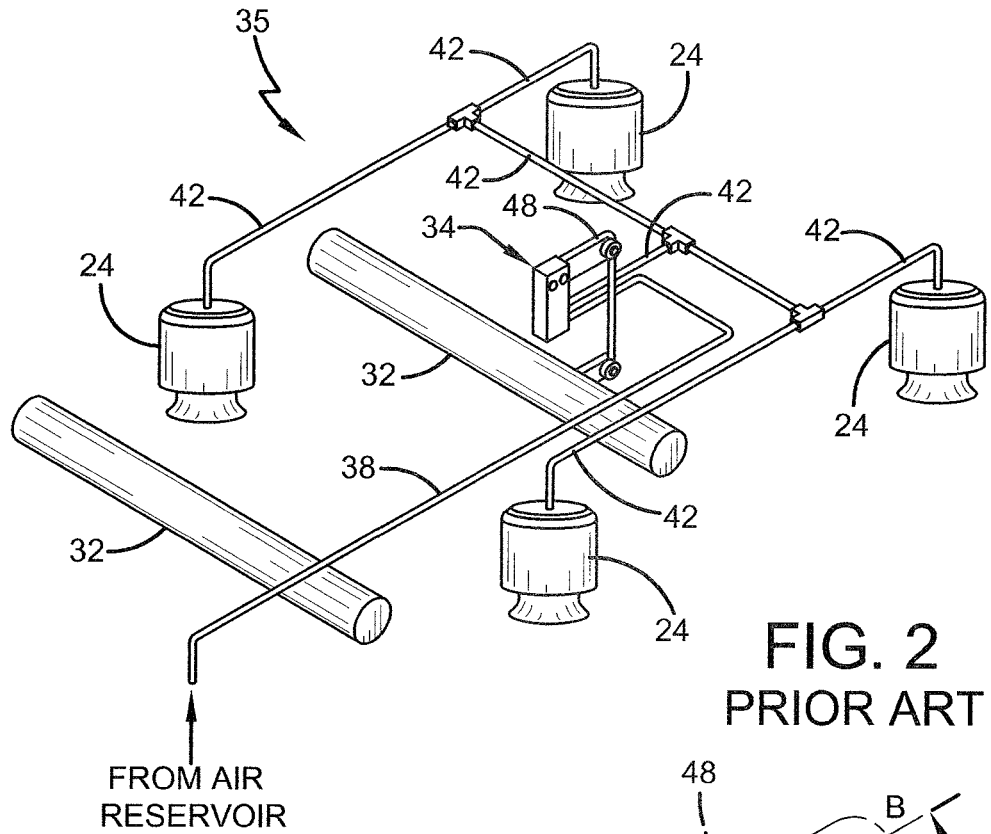
FIG. 2 is a schematic representation of a prior art pneumatic control system for air springs utilized in conjunction with a pair of axle/suspension systems of a heavy-duty vehicle, showing the relative positions of the air springs and axles of the axle/suspension systems.
Figure 3:
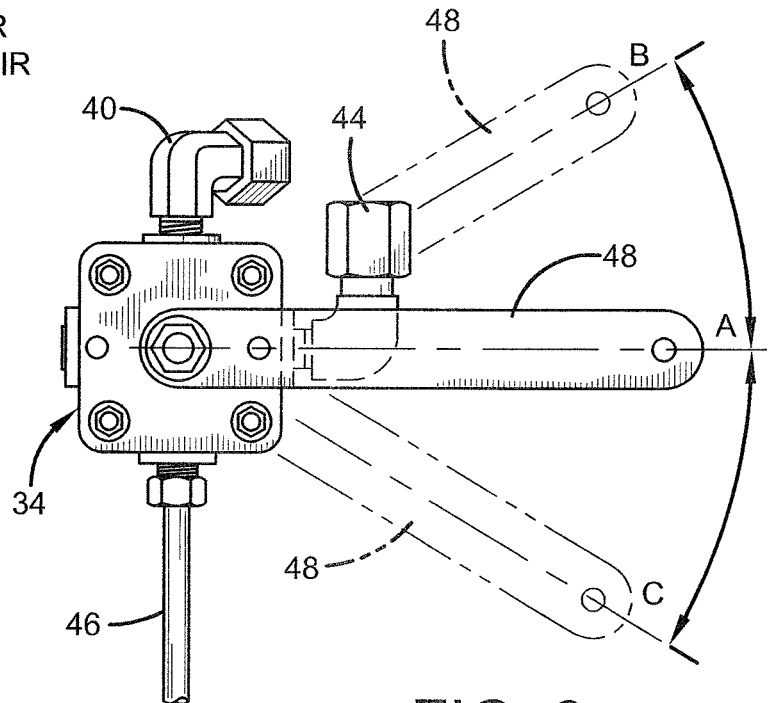
FIG. 3 is an enlarged elevational view of the height control valve utilized in conjunction with the prior art pneumatic control system shown in FIG. 2, showing alternate valve control arm positions represented by broken lines.

With additional reference to FIG. 2, prior art pneumatic control system 35, which utilizes height control valve 34 such as the one shown in FIGS. 1 and 3, is schematically shown in FIG. 2 and will now be described in detail below.

Prior art pneumatic control system 35 includes an air reservoir conduit 38 which is in fluid communication with height control valve 34 via an air reservoir fitting 40, and provides compressed air to the height control valve from an air reservoir (not shown), such as an air tank, as known to those skilled in the art. An air spring conduit 42 is in fluid communication with height control valve 34 via an air spring fitting 44 (FIG. 3) and branches off to each air spring 24, thereby enabling the height control valve to route or allow flow of compressed air to and from the air springs based on certain operational conditions, as will be described below. An exhaust conduit 46 is in fluid communication with and extends from height control valve 34, enabling the height control valve to exhaust compressed air to atmosphere, as will also be described in detail below. It is to be understood that additional pneumatic and/or electronic components (not shown) that are known and used in the art, such as electronic controllers, valves, vents and pneumatic lines, may be used in conjunction with conduits 38, 42, 46 and/or height control valve 34.

Referring now to FIGS. 1 and 3, height control valve 34 preferably is a three-way valve that includes control arm 48, wherein the position of the arm controls the operation of the height control valve. More particularly, when control arm 48 is in a horizontal or neutral position A, height control valve 34 is closed and does not route compressed air from air reservoir conduit 38 (FIG. 2) to air springs 24 via air spring conduits 42, nor does it exhaust air from the air springs to atmosphere via exhaust conduit 46. When control arm 48 is in a fill position B, height control valve 34 routes compressed air from air reservoir conduit 38 to air spring conduits 42 (FIG. 2) and thus to air springs 24, thereby inflating the air springs. When control arm 48 is in an exhaust position C, height control valve 34 exhausts air from air springs 24 via air spring conduits 42, and communicates the exhausted air to exhaust conduit 46 (FIG. 2) and thus to atmosphere.

Automatic actuation of control arm 48, and thus activation of the operation of height control valve 34, is provided by control valve link 50, as shown in FIG. 1. More specifically, control valve link 50 is pivotally connected at its upper end to control arm 48 via fastener 52 or other means known in the art, and is also pivotally connected at its lower end to beam 18 via mounting bracket 54 and fastener 56.

During vehicle operation, when axle/suspension system 10 articulates to an air spring compressed or jounce position, the distance between vehicle frame 12 and beam 18 decreases, compressing air spring 24. Because height control valve 34 is connected to frame 12, the height control valve has the same general height as the frame. To maintain design ride height, when the distance between vehicle frame 12 and beam 18 decreases, control valve link 50 moves control arm 48 upwardly from neutral position A to fill position B, as shown in FIG. 3, thereby activating height control valve 34 and causing the height control valve to route compressed air from air reservoir conduit 38 to air springs 24 via air spring conduits 42, thereby inflating air springs 24, and in turn returning beam 18 to the design ride height.

Conversely, when axle/suspension system 10 articulates to an air spring extended or rebound position, the distance between vehicle frame 12 and beam 18 increases, extending air spring 24. To maintain design ride height, when the distance between vehicle frame 12 and beam 18 increases, control valve link 50 moves control arm 48 downwardly from neutral position A to exhaust position C, as shown in FIG. 3, thereby activating height control valve 34 and causing the height control valve to exhaust compressed air from air spring 24 via exhaust conduit 46, and in turn returning beam 18 to the design ride height.

As set forth above, prior art pneumatic control system 35 maintains the design ride height of axle/suspension system 10 when the axle/suspension system articulates during vehicle operation. For most operations, prior art pneumatic control system 35 operates effectively and maintains the design ride height. However, in certain outrigger operations and/or lifting of a trailer onto a rail flatbed, and other similar operations, prior art pneumatic control system 35 completely exhausts air spring 24 when it is extended, potentially causing damage to the flexible member of the air spring. More specifically, during certain outrigger operations or placement of a trailer on a rail flatbed, control arm 48 is moved into an exhaust position C causing height control valve 34 to exhaust air from air springs 24 via air spring conduits 42. The exhaustion of fluid from air springs 24 may potentially cause damage to the air springs. More specifically, wheels 31 are disengaged from the travel surface, thereby causing complete extension of air springs 24 of the axle/suspension system. In both events, as air springs 24 become extended, height control valve 34 automatically exhausts fluid from the air springs in order to attempt to return the axle/suspension system to design ride height.

However, because air springs 24 are extended due to an external force, i.e. the outriggers or the crane lifting the trailer off of the ground, exhaustion of the air spring by height control valve 34 does not return the vehicle to design ride height but rather can potentially create a vacuum in the air bag 27 or flexible member of air spring 24, thereby collapsing the air bag inwardly onto itself. When this occurs and when axle/suspension system 10 is lowered back onto the ground by the outrigger or the crane, air bag 27 of air spring 24 can become pinched or trapped between the internal bumper (not shown) and the upper bead plate (not shown) of the air spring, resulting in potential damage to the air bag of the air spring. As air pressure is reintroduced into air springs 24, air bag 27 of the air spring can remain pinched, so that when the vehicle encounters a bump, the air bag can pop out violently from its pinched state, possibly causing damage to the air bag or air spring piston 28. In addition, once air springs 24 have become completely exhausted because of such lifting maneuvers, it takes longer for pneumatic control system 35 to re-inflate them in order to return the air springs to design ride height.

Figure 4A:
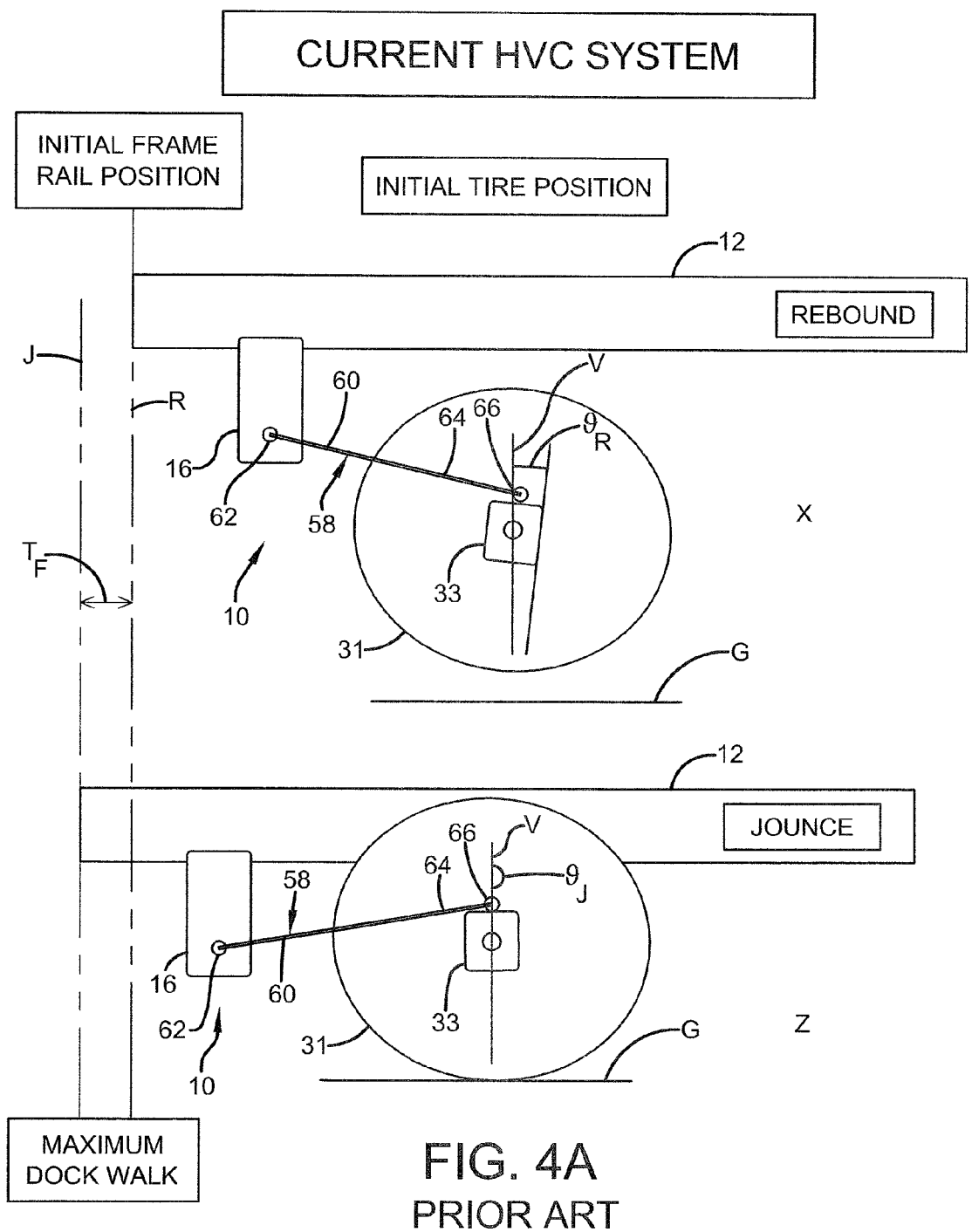
FIG. 4A is a fragmentary elevational schematic representation of the truck axle/suspension system shown in FIG. 1 during outrigger retraction where the vehicle is lowered from an axle/suspension system rebound position to an axle/suspension system jounce position, illustrating the resulting phenomena of dock walk that can occur when utilizing prior art pneumatic control systems.
Figure 4B:
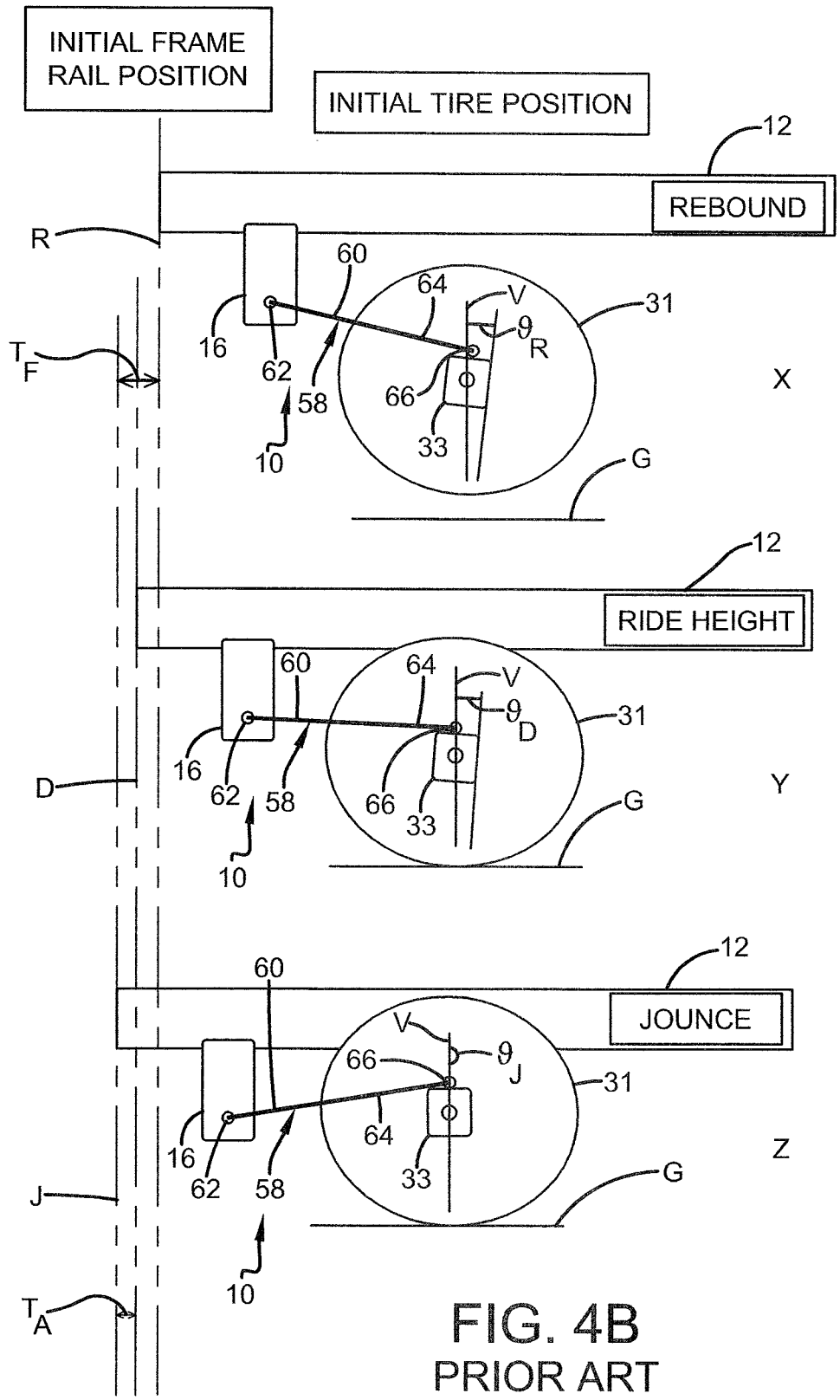
FIG. 4B is a fragmentary elevational schematic representation of the truck axle/suspension system shown in FIG. 4A, illustrating the various positions of the truck axle/suspension system during the outrigger retraction operation which include the axle/suspension system rebound position, the axle/suspension system design ride height position, and the axle/suspension system jounce position.

Additionally, during outrigger retraction operations, undesirable fore-aft movement may occur as shown in FIGS. 4A-4B. More particularly, as the vehicle (not shown) is lowered with the brakes (not shown) activated, the height of vehicle axle/suspension system 10 changes as shown in FIGS. 4A-4B. More specifically, during the outrigger retraction operation, the vehicle is lowered by the outriggers from an axle/suspension system rebound position X, where air spring 24 has become extended, to an axle/suspension system jounce position Z, where air spring 24 has become compressed, and ultimately to an axle/suspension system design ride height position Y as the air springs are re-inflated by height control valve 34. The outrigger retraction operation can potentially impact various components as will be described in more detail below.

As a result of the fixed length of longitudinal control member 58 relative to hanger 16 and the fixed nature of axle clamp assembly 36 (FIG. 1) to axle housing 33, an axle housing angle $\theta$, or pinion angle, changes as the vehicle is lowered by the outriggers (not shown). Axle housing angle $\theta$ is measured generally relative to vertical line V extending through the center of axle housing 33 and the rear wall of the axle housing. Axle housing angle $\theta$ exhibits three critical states based on the position of the axle/suspension system during outrigger operations including a rebound angle $\theta_R$, a jounce angle $\theta_J$, and a design ride height angle $\theta_D$. During outrigger retraction, when wheel 31 contacts ground G, the weight of the vehicle causes axle/suspension system 10 to move from rebound position X to jounce position Z. More specifically, when wheels 31 come into contact with ground G, longitudinal control member 58 and clamp assembly 36 pivot upwardly relative to hanger 16. The upward pivoting of longitudinal control member 58 and clamp assembly in turn causes axle housing angle $\theta$ to change, which in turn causes the wheels to rotate in a counterclockwise direction along the ground surface. More particularly, axle housing angle $\theta$ changes from rebound angle $\theta_R$, to jounce angle $\theta_J$, causing wheels 31 to rotate in a counterclockwise direction as the axle housing angle changes. As a result, the vehicle moves forward from an axle/suspension system rebound rail position R to an axle/suspension system jounce rail position J indicated by a distance, $T_F$, or the maximum dock walk distance. The forward movement of the vehicle can potentially cause stress and damage to the outrigger components as they are being retracted from the ground.

As axle/suspension system 10 reaches jounce position Z, height control valve 34 directs air to air springs 24 of the axle/suspension system in order to return the axle/suspension system to design ride height Y. More specifically, as a result of the continued activation of the brakes, the fixed length of longitudinal control member 58 and the fixed nature of axle clamp assembly 36, the longitudinal control member and the axle clamp assembly pivot downwardly relative to hanger 16 as air springs 24 are inflated. The downward pivoting of longitudinal control member 58 and axle clamp assembly 36 causes axle housing angle θ to change from jounce angle $θ_J$ to the design ride height angle $θ_D$, which in turn causes wheels 31 to rotate in a clockwise direction along the ground surface. As a result, the vehicle moves from axle/suspension jounce rail position J to an axle/suspension design ride height rail position D, a distance of $T_A$. The rearward movement of the vehicle can potentially cause stress and damage to the outrigger components as they are being retracted from the ground.

As can be seen, the forward movement of the vehicle caused by the movement of axle/suspension system 10 from rebound position X to jounce position Z and the subsequent rearward movement of the vehicle caused by the movement of the axle/suspension system from jounce position Z to design ride height position Y, can potentially cause stress and damage to the outrigger components during the outrigger retraction operation.

The preferred embodiment pneumatic control systems of the present invention overcome these problems and the structure and operation of the pneumatic control systems will be described in detail below.

Figure 5A:
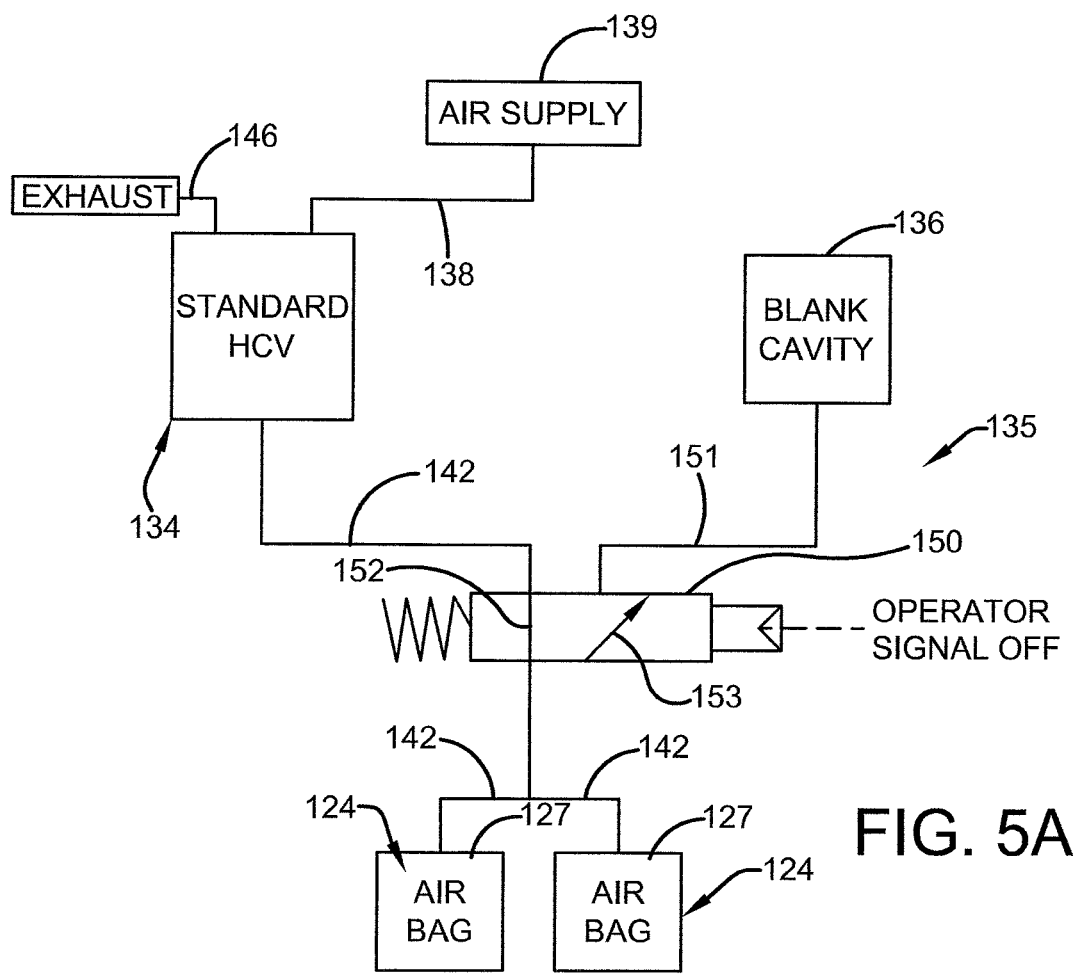
FIG. 5A is a schematic representation of a first preferred embodiment pneumatic control system of the present invention, showing the air lock valve in an "air lock off" position.
Figure 5B:
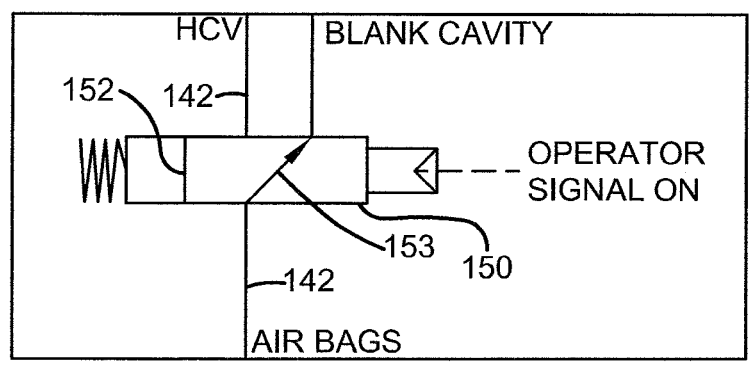
FIG. 5B is a schematic representation of the air lock valve shown in FIG. 5A, showing the air lock valve in an "air lock on" position.

Turning now to FIGS. 5A and 5B, a first preferred embodiment pneumatic control system with air lock/retention functionality is schematically shown at reference number 135, and will be described in detail below. First preferred embodiment pneumatic control system 135 includes an air supply 139, such as an air tank. Air supply 139 is in fluid communication with a height control valve 134 via a conduit 138. Height control valve 134 is in fluid communication with atmosphere via an exhaust conduit 146. Height control valve 134 is also in fluid communication with air springs 124 via conduit 142. An air lock valve 150 is disposed along conduit 142 between height control valve 134 and air springs 124. Air lock valve 150 is a three way, two-position valve including a first passage 152 and an alternate passage 153. Air lock valve 150 is also in fluid communication with a blank cavity 136 via a conduit 151. When air lock valve 150 is in its standard "air lock off" position, as shown in FIG. 5A, air or fluid is allowed to flow from height control valve 134, through conduit 142, through first air passage 152 of air lock valve 150, and through conduit 142 into air springs 124. Alternatively, when air lock valve 150 is in an "air lock on" position, as shown in FIG. 5B, fluid is allowed to flow from air springs 124 through conduit 142, through alternate air passage 153 of lock valve 150, and through conduit 151 into blank cavity 136. Air lock valve 150 is actuated or energized into the "air lock on" position via an electrical signal manually initiated by the operator of the vehicle. Additional means for actuating air lock valve 150 are also contemplated by the instant invention, such as an automated means that simultaneously actuates the air lock valve while actuating another process, such as a PTO (power take-off).

Figure 6:
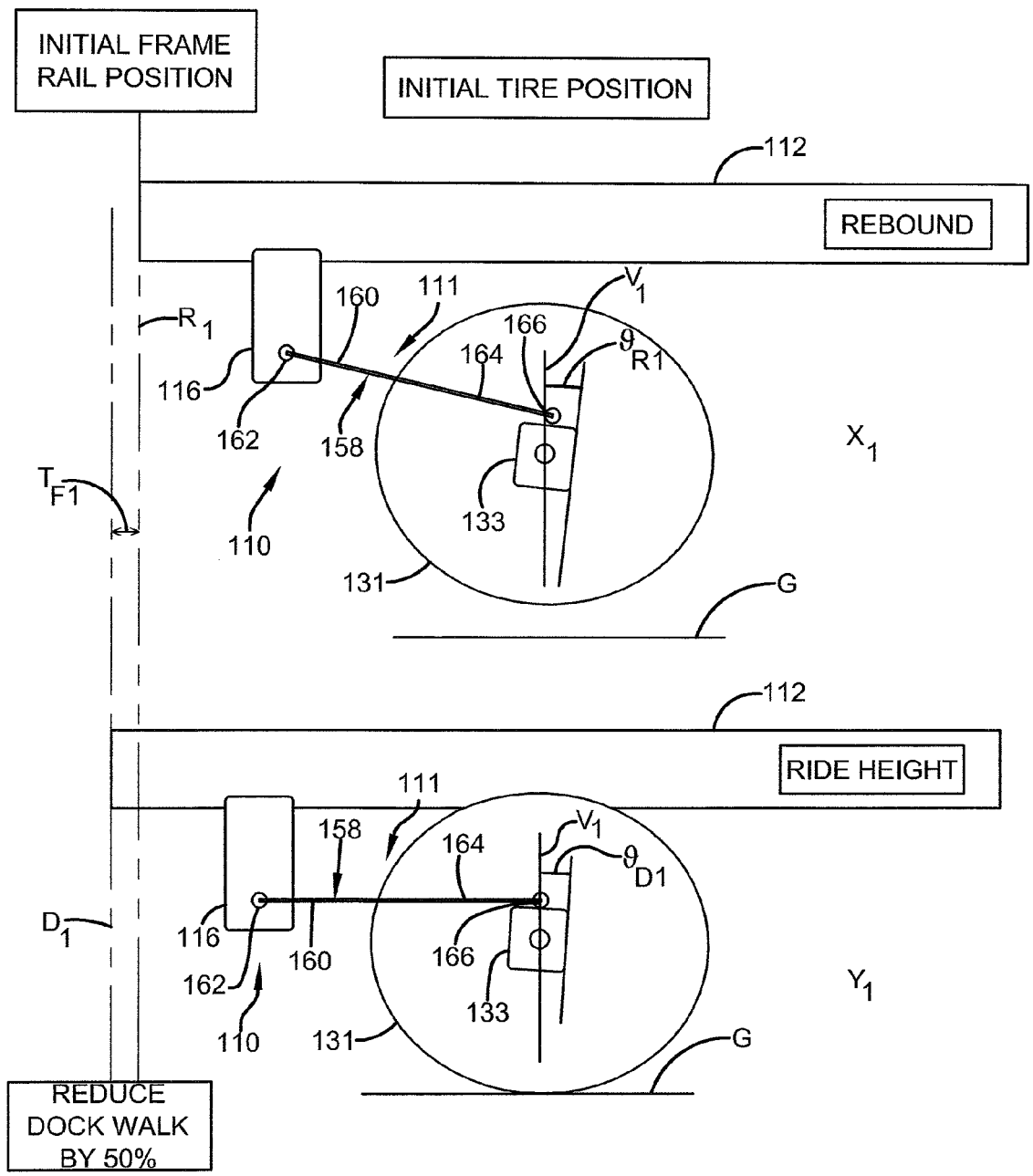
FIG. 6 is a fragmentary elevational schematic representation of a truck axle/suspension system incorporating the first preferred embodiment pneumatic control system of the present invention, showing the truck axle/suspension system during outrigger retraction where the vehicle is lowered from an axle/suspension system rebound position to an axle/suspension system design ride height position, and illustrating reduced dock walk.

Turning to FIG. 6, a schematic representation of portions of an axle/suspension system 110 that incorporates height control valve 134 (FIGS. 5A-5B) is shown. Axle/suspension system 110 is generally identical to axle/suspension system 10 set forth above. However, for the sake of clarity and conciseness, only certain portions of axle/suspension system 110 will be described below. Axle/suspension system 110 includes a pair of suspension assemblies 111 (only portions of the driver-side assembly shown). For the sake of clarity and conciseness, only the driver-side suspension assembly 111 will be described, with the understanding that a generally identical curb-side suspension assembly is located on the other side of the vehicle. More specifically, suspension assembly 111 includes a longitudinal control member 158, which is pivotally connected at a junction 162 to a hanger 116 at a front end 160 of the longitudinal control member. A rear end 164 of longitudinal control member 158 is pivotally connected at junction 166 to an axle housing 133. Longitudinal control member 158 extends a fixed length from hanger 116 to axle housing 133. For sake of completeness, hanger 116 is rigidly connected to a frame rail 112.

Having now described the structure of first embodiment pneumatic control system 135 of the present invention and axle/suspension system 110 in which it is incorporated, the operation of the pneumatic control system during an outrigger operation will now be described in detail below.

During outrigger operations and other similar operations, such as lifting a trailer onto a rail flatbed, that typically completely extend air springs 124 air lock valve 150 is activated by the vehicle operator to the "air lock on" position, as shown in FIG. 5B. When air lock valve 150 is in an "air lock on" position, alternate passage 153 of the air lock valve fluidly connects air springs 124 to blank cavity 136 via conduits 142 and 151. In this manner, the fluid volume of air springs 124 is locked and/or maintained such that potential damage to an air bag 127 is prevented when height control valve 134 is in position C (FIG. 3) and air springs 124 of axle/suspension system 110 are completely extended, and height control valve 134 is attempting to exhaust air from the air springs to return axle/suspension system 110 to design ride height. By retaining fluid in air springs 124 during an operation that causes such extension or the air springs rather than exhausting air as in prior art pneumatic control system 35, creation of a vacuum in air spring air bag 127 is prevented, which in turn prevents collapse of the air bag onto itself. Thus, when axle/suspension system 110 is lowered back onto the ground after operation of the outrigger or crane, air bag 127 will not become pinched or trapped, and thus damage to air spring 124 may be prevented. In addition, re-inflation of air springs 124 will be unnecessary due to the presence of the retained air in the air springs. More specifically, after the outrigger operation, or other operations that completely extend air springs 124, is completed, the heavy-duty vehicle is lowered until the outrigger is fully disengaged and wheels 131 of axle/suspension system 110 once again are in contact with the surface of the ground. Because the air volume in air springs 124 has been maintained by first embodiment pneumatic control system 135, once the vehicle is set back onto the ground, axle/suspension system 110 remains relatively close to the vehicle design ride height as a result of the locked air volume between blank 136 and air springs 124. The operator of the vehicle now halts the activation of air lock valve 150 and it returns to its normal operating position, the "air lock off" position, as shown in FIG. 5A. When air lock valve 150 is in the "air lock off" position, passage 152 of the air lock valve fluidly connects air springs 124 to height control valve 134 via conduit 142. In this position, first preferred embodiment pneumatic control system 135 of the present invention resumes operation similar to prior art pneumatic control system 35 described above. Because the air volume is maintained in air springs 124 during the operation of the outrigger, only minimal re-inflation of the air springs is required to return the heavy-duty vehicle back to design ride height. The maintenance of the air volume in air springs 124 also reduces dock walk as will be described in detail below.

As described above, during outrigger deployment/retraction operations air lock valve 150 is activated by the vehicle operator to the "air lock on" position, as shown in FIG. 5B. As the vehicle is raised/lowered by the outriggers (not shown), an axle housing angle $\theta_1$, or pinion angle, changes as a result of the fixed distance of longitudinal control member 158 relative to hanger 116 and the fixed nature of the axle clamp assembly (not shown). Axle housing angle $\theta_1$ is measured generally relative to a vertical line $V_1$ extending through the center of axle housing 133 and the rear wall of the axle housing. Axle housing angle $\theta_1$ exhibits two critical states based on the position of the axle/suspension system, a rebound angle $\theta_{R1}$, and a design ride height angle $\theta_{D1}$. As the vehicle is lowered by the outriggers, wheel 131 contacts ground G. The weight of the vehicle (not shown) causes axle/suspension system 110 to move from a rebound position $X_1$ to a design ride height position $Y_1$. More specifically, when wheel 131 comes into contact with ground G, longitudinal control member 158 and the axle clamp assembly pivot upwardly relative to hanger 116, the upward pivoting of the longitudinal control member and the axle clamp assembly in turn cause axle housing angle $\theta_1$ to change, which in turn causes the wheels to rotate in a counterclockwise direction along the ground surface. More particularly, axle housing angle $\theta_1$ changes from a rebound angle $\theta_{R1}$ to design ride height angle $\theta_{D1}$, which in turn causes wheels 133 to rotate as the axle housing angle changes. As a result, the vehicle moves from an axle/suspension rebound rail position $R_1$ to an axle/suspension system design ride height rail position $D_1$, a distance of $T_{F1}$. The elimination of axle/suspension system jounce position Z (FIGS. 4A and 4B) is a result of the air volume maintained in air springs 124 by the fluid communication between the air springs and blank cavity 136 when air lock valve 150 is in the "air lock on" position (FIG. 5B). Additionally, distance $T_{F1}$, is generally approximately 50% less than $T_F$ (FIGS. 4A-4B) of the prior art. The minimization of the fore-aft movement of the vehicle during outrigger retraction operations generally minimizes potential stress and damage to the outrigger components and provides generally longer service life to the outrigger components.

Figure 7A:
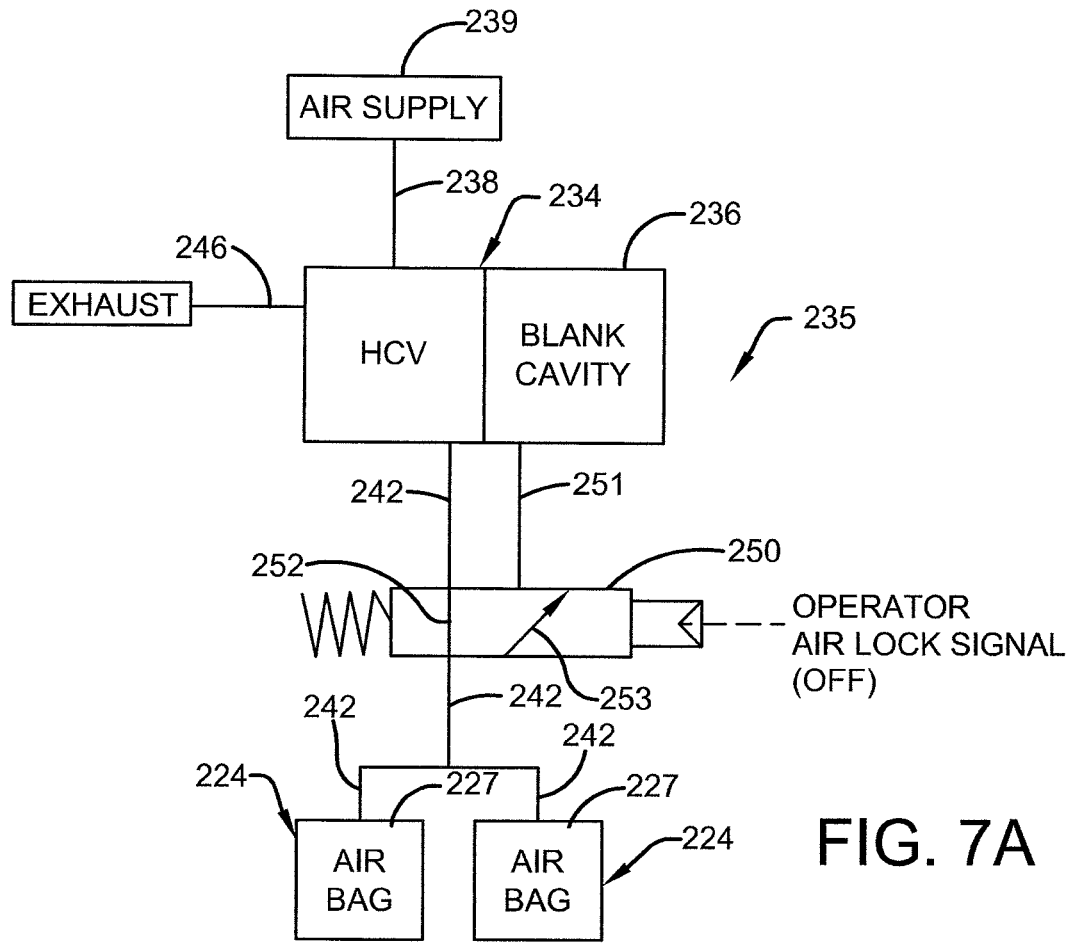
FIG. 7A is a schematic representation of a second preferred embodiment pneumatic control system of the present invention, showing the blank cavity incorporated into the height control valve and showing the air lock valve in an "air lock off" position.
Figure 7B:
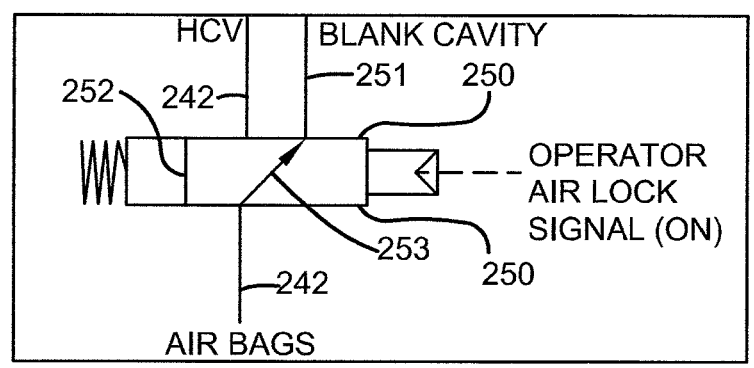
FIG. 7B is a schematic representation of the air lock valve shown in FIG. 7A, showing the air lock valve in an "air lock on" position.

Turning to FIGS. 7A and 7B, a second preferred embodiment pneumatic control system with air lock/retention functionality is schematically shown at reference number 235, and will be described in detail below. Second preferred embodiment pneumatic control system 235 includes an air supply 239, such as an air tank. Air supply 239 is in fluid communication with a height control valve 234, which includes an integral blank cavity 236, via a conduit 238. Height control valve 234 is also in fluid communication with atmosphere via exhaust conduit 246. Height control valve 234 is also in fluid communication with air springs 224 via a conduit 242. An air lock valve 250 is disposed along conduit 242 between height control valve 234 and air springs 224. Air lock valve 250 is a three way, two-position valve including a first passage 252 and an alternate passage 253. Air lock valve 250 is also in fluid communication with a blank cavity 236, integrated into height control valve 234, via a conduit 251. When air lock valve 250 is in its standard "air lock off" position, as shown in FIG. 7A, fluid is allowed to flow from height control valve 234, through conduit 242, through first air passage 252 of air lock valve 250, through conduit 242, and into air springs 224. When air lock valve 250 is activated by the operator of the vehicle into an "air lock on" position, as shown in FIG. 7B, fluid is allowed to flow from air springs 224 through conduit 242, through alternate air passage 253 of lock valve 250, and through conduit 251 into blank cavity 236, integrally formed in height control valve 234. Air lock valve 250 is activated or energized into the "air lock on" position via an electrical signal manually initiated by the operator of the vehicle. Additional means for actuating air lock valve 250 are also contemplated by the instant invention, such as an automated means that simultaneously actuates the air lock valve while actuating another process, such as a PTO (power take-off).

Figure 8:
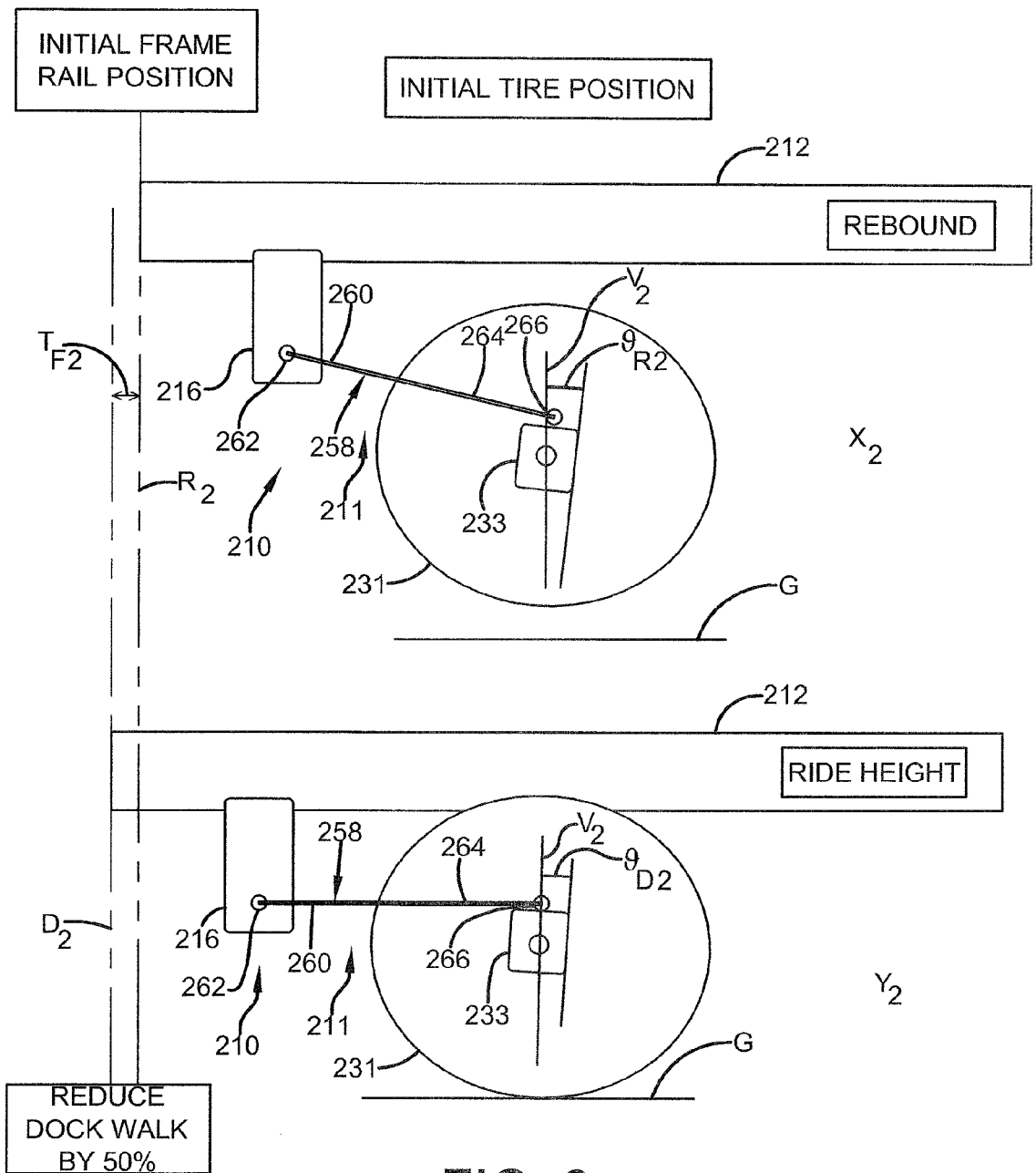
FIG. 8 is a fragmentary elevational schematic representation of the truck axle/suspension system incorporating the second preferred embodiment pneumatic control system of the present invention, showing the truck axle/suspension system during outrigger retraction where the vehicle is lowered from an axle/suspension system rebound position to an axle/suspension system design ride height position, and illustrating reduced dock walk.

Turning to FIG. 8, a schematic representation of portions of an axle/suspension system 210 that incorporates height control valve 234 (FIGS. 7A-7B) is shown. Axle/suspension system 210 is generally identical to axle/suspension system 10 set forth above. However, for the sake of clarity and conciseness, only certain portions of axle/suspension system 210 will be described below. Axle/suspension system 210 includes a pair of suspension assemblies 211 (only portions of the driver-side assembly shown). For the sake of clarity and conciseness, only the driver-side suspension assembly 211 will be described, with the understanding that a generally identical curb-side suspension assembly is located on the other side of the vehicle. More specifically, suspension assembly 211 includes a longitudinal control member 258 that is pivotally connected at a junction 262 to a hanger 216 at a front end 260 of the longitudinal control member. A rear end 264 of longitudinal control member 258 is pivotally connected at junction 266 to an axle housing 233. Longitudinal control member 258 extends a fixed length from hanger 216 to axle housing 233. For sake of completeness, hanger 216 is rigidly connected to a frame rail 212.

Having now described the structure of second embodiment pneumatic control system 235 of the present invention and axle/suspension system 210 in which it is incorporated, the operation of the pneumatic control system during an outrigger operation will now be described in detail below.

During outrigger operations and other similar operations, such as lifting a trailer onto a rail flatbed, that typically completely extend air springs 224, air lock valve 250 is activated to the "air lock on" position by the vehicle operator, as shown in FIG. 7B. When air lock valve 250 is in an "air lock on" position, alternate passage 253 of the air lock valve fluidly connects air springs 224 to blank cavity 236 via conduits 242 and 251. In this manner, the air volume of air springs 224 is locked and/or maintained such that potential damage to at least one air bag 227 is prevented when height control valve 234 is in position C (FIG. 3) and air springs 224 of axle/suspension system 210 are completely extended, and height control valve 234 is attempting to exhaust air from the air springs to return axle/suspension system 210 to design ride height. By retaining fluid in air springs 224 during an operation that causes such extension of the air springs rather than exhausting air as in prior art pneumatic control system 35, creation of a vacuum in air spring air bag 227 is prevented, which in turn prevents collapse of the air bag onto itself. Thus, when axle/suspension system 210 is lowered back onto the ground after operation of the outrigger or crane, air bag 227 will not become pinched or trapped and thus damage to air spring 224 may be prevented. In addition, re-inflation of air springs 224 will be unnecessary due to the presence of the retained air in the air springs.

More specifically, after the outrigger operation, or other operations that completely extend air springs 224, is completed, the heavy-duty vehicle is lowered until the outrigger is fully disengaged and wheels 230 of axle/suspension system 210 once again are in contact with the surface of the ground. Because the air volume in air springs 224 has been maintained by air lock valve 250 of second embodiment pneumatic control system 235, once the vehicle is set back onto the ground, axle/suspension system 210 remains relatively close to the vehicle design ride height as a result of the locked air volume between blank 236 and air springs 224. The operator of the vehicle halts activation of air lock valve 250 and it returns to the "air lock off" position, as shown in FIG. 7A. When air lock valve 250 is in the "air lock off" position, passage 252 of the air lock valve fluidly connects air springs 224 to height control valve 234 via conduit 242. In this position, second preferred embodiment pneumatic control system 235 of the present invention resumes operation similar to prior art pneumatic control system 35 described above. Because the air volume is maintained in air springs 224 during the operation of the outrigger, only minimal re-inflation of the air springs is required to return the heavy-duty vehicle back to design ride height. The maintenance of the air volume in air springs 224 also reduces dock walk as will be described in detail below.

As described above, during outrigger deployment/retraction operations air lock valve 250 is activated by the vehicle operator to the "air lock on" position, as shown in FIG. 7B.

As the vehicle is raised/lowered by the outriggers (not shown), an axle housing angle $\theta_2$, or pinion angle, changes as a result of the fixed distance of longitudinal control member 258 relative to hanger 216 and the fixed nature of the axle clamp assembly (not shown). Axle housing angle $\theta_2$ is measured generally relative to a vertical line $V_2$ extending through the center of axle housing 233 and the rear wall of the axle housing. Axle housing angle $\theta_2$ exhibits two critical states based on the position of the axle/suspension system, a rebound angle $\theta_{R2}$, and a design ride height angle $\theta_{D2}$ changes as the vehicle is lowered by the outriggers (not shown). As the vehicle is lowered by the outriggers, wheel 231 contacts ground G. The weight of the vehicle causes axle/suspension system 210 to move from a rebound position $X_2$ to a design ride position $Y_2$. More specifically, when wheel 231 comes into contact with ground G, longitudinal control member 258 and the axle clamp assembly pivot upwardly relative to hanger 216, the upward pivoting of the longitudinal control member in turn causes axle housing angle $\theta_2$ to change, which in turn causes the wheels to rotate in a counterclockwise direction along the ground. More particularly, axle housing angle $\theta_2$ changes from a rebound angle $\theta_{R2}$ to a design ride height angle $\theta_{D1}$, which in turn causes the wheels 233 to rotate as the axle housing angle changes. As a result, the vehicle moves from an axle/suspension system rebound rail position $R_2$ to an axle/suspension system design ride height rail position $D_2$, a distance of $T_{F2}$. The elimination of axle/suspension system jounce position Z (FIGS. 4A and 4B) is a result of the air volume maintained in air springs 224 by the fluid communication between the air springs and blank cavity 236 when air lock valve 250 is in the "air lock on" position (FIG. 7B). Additionally, distance $T_{F2}$, measured from $R_2$ to $D_2$, is generally about 50% less than $T_F$ (FIGS. 4A-4B) of the prior art. The minimization of the fore-aft movement of the vehicle during outrigger retraction operations generally minimizes potential stress and damage to the outrigger components and provides generally longer service life to the outrigger components.

Figure 9:
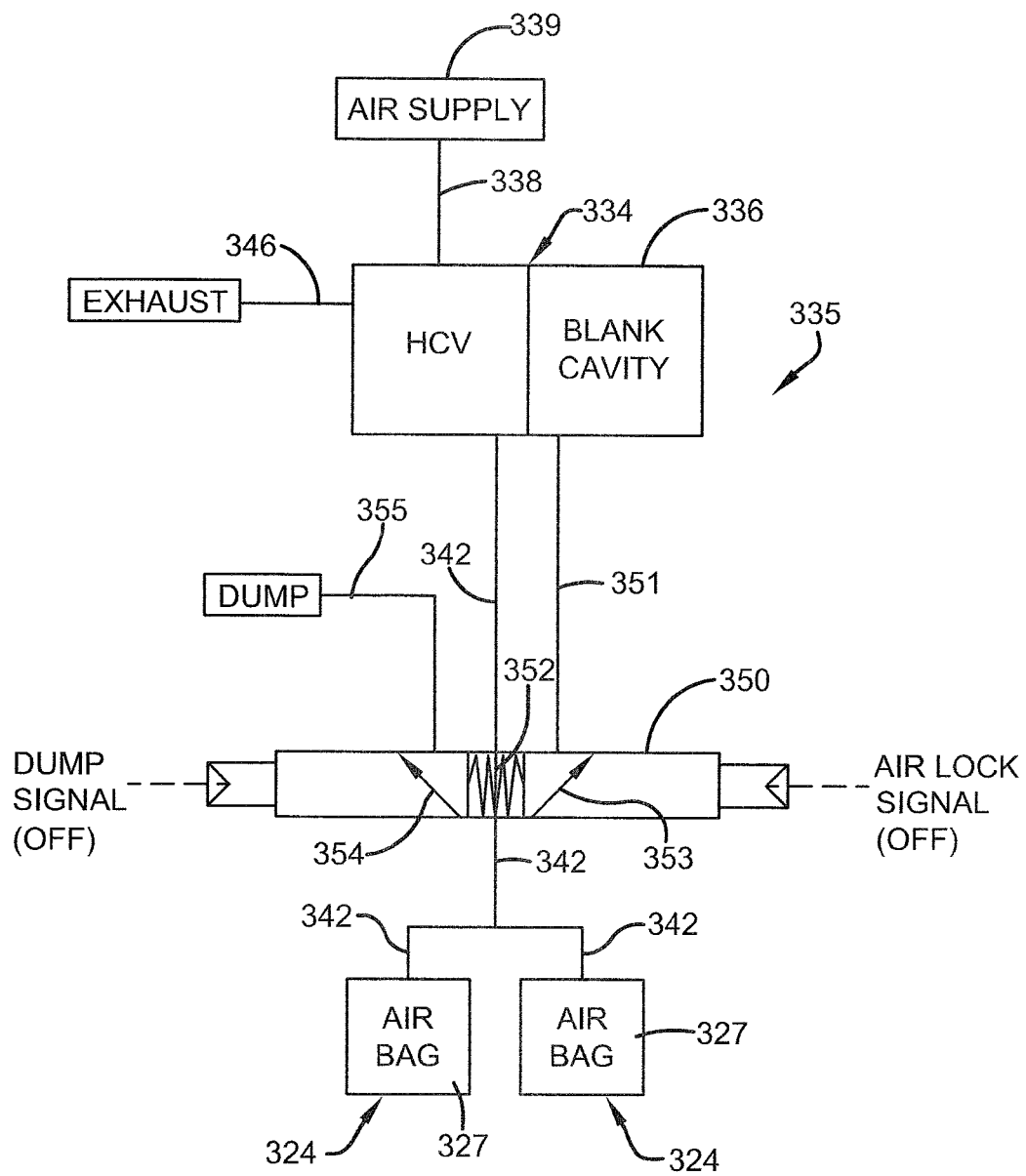
FIG. 9 is a schematic representation of a third preferred embodiment pneumatic control system of the present invention, showing the air lock valve in an "air lock off" position and incorporating an air dumping feature.
Figure 9A:
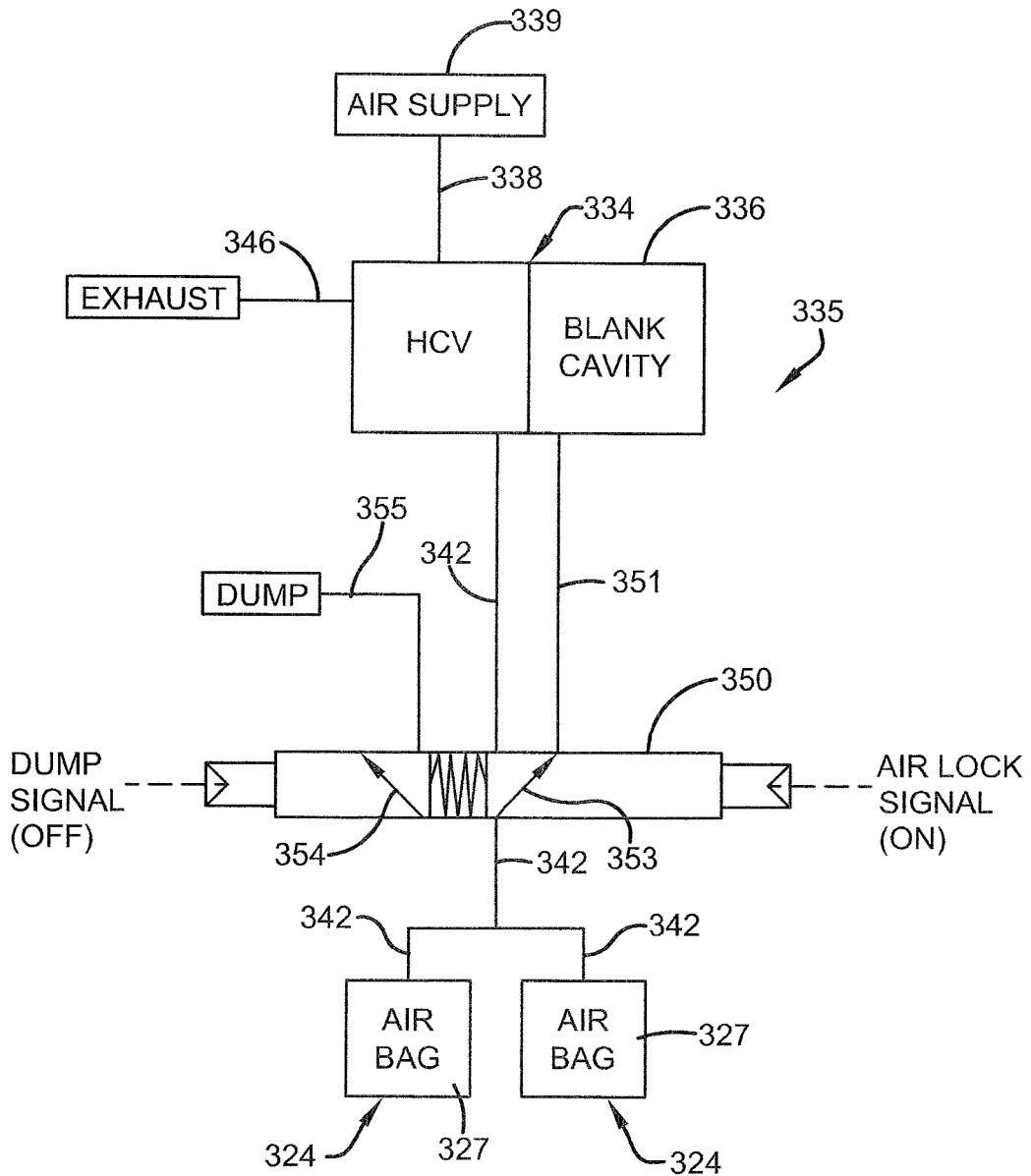
FIG. 9A is a schematic representation of the third preferred embodiment pneumatic control system of the present invention shown in FIG. 9, showing the air lock valve in an "air lock on" position.
Figure 9B:
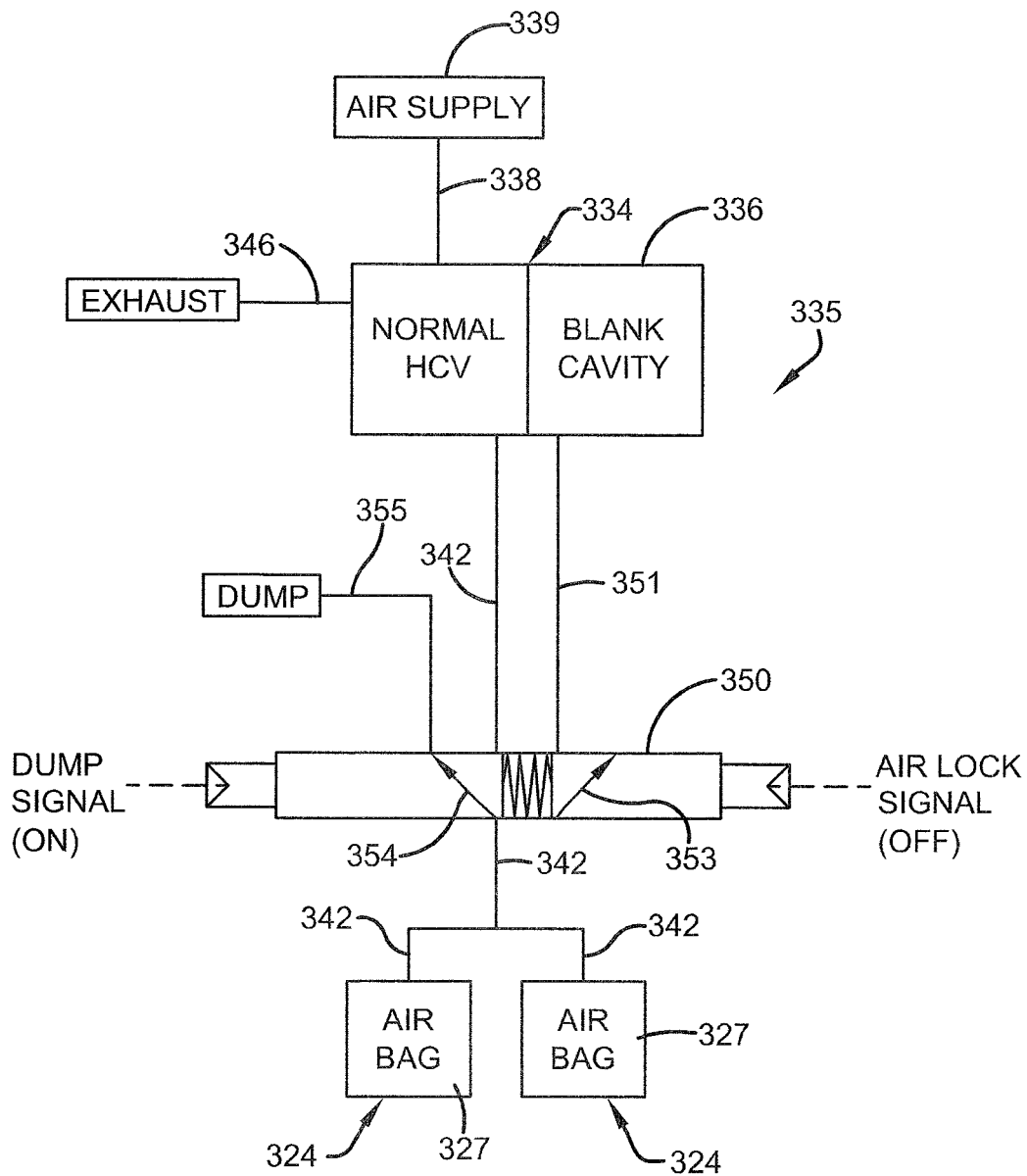
FIG. 9B is a schematic representation of the third preferred embodiment pneumatic control system of the present invention shown in FIG. 9, showing the air lock valve in a "dump" position.

Turning to FIG. 9, a third preferred embodiment pneumatic control system with air lock/retention functionality and a dump feature is schematically shown at reference number 335, and will be described in detail below. Third preferred embodiment pneumatic control system 335 includes an air supply 339, such as an air tank. Air supply 339 is in fluid communication with a height control valve 334, which includes an integral blank cavity 336, via a conduit 338. Height control valve 334 is also in fluid communication with atmosphere via exhaust conduit 346. Height control valve 334 is also in fluid communication with air springs 324 via conduit 342. An air lock valve 350 is disposed along conduit 342 between height control valve 334 and air springs 324. Air lock valve 350 is a four-way, three position valve including a first passage 352, an alternate passage 353, and a dump passage 354. Air lock valve 350 is also in fluid communication with blank cavity 336, integrated into height control valve 334, via a conduit 351. Air lock valve 350 is also in fluid communication with atmosphere via a dump conduit 355. When air lock valve 350 is in its standard "air lock off" operating state, as shown in FIG. 9, air or fluid is allowed to flow from height control valve 334, through conduit 342, through first air passage 352 of air lock valve 350, through conduit 342, and into air springs 324. When air lock valve 350 is in an "air lock on" position, as shown in FIG. 9A, fluid is allowed to flow from air springs 324 through conduit 342, through alternate air passage 353 of lock valve 350, through conduit 351, and into blank cavity 336, integrally formed in height control valve 334. When air lock valve 350 is in a "dump" position, as shown in FIG. 9B, fluid is allowed to flow from air springs 324, through conduit 342, through dump passage 354, through dump conduit 355, and to atmosphere. Air lock valve 350 is actuated or energized into the "air lock on" position and the "dump" position via an electrical signal manually initiated by the operator of the vehicle. Additional means for actuating air lock valve 350 are also contemplated by the instant invention, such as an automated means that simultaneously actuates the air lock valve while actuating another process, such as a PTO (power take-off).

Figure 10:
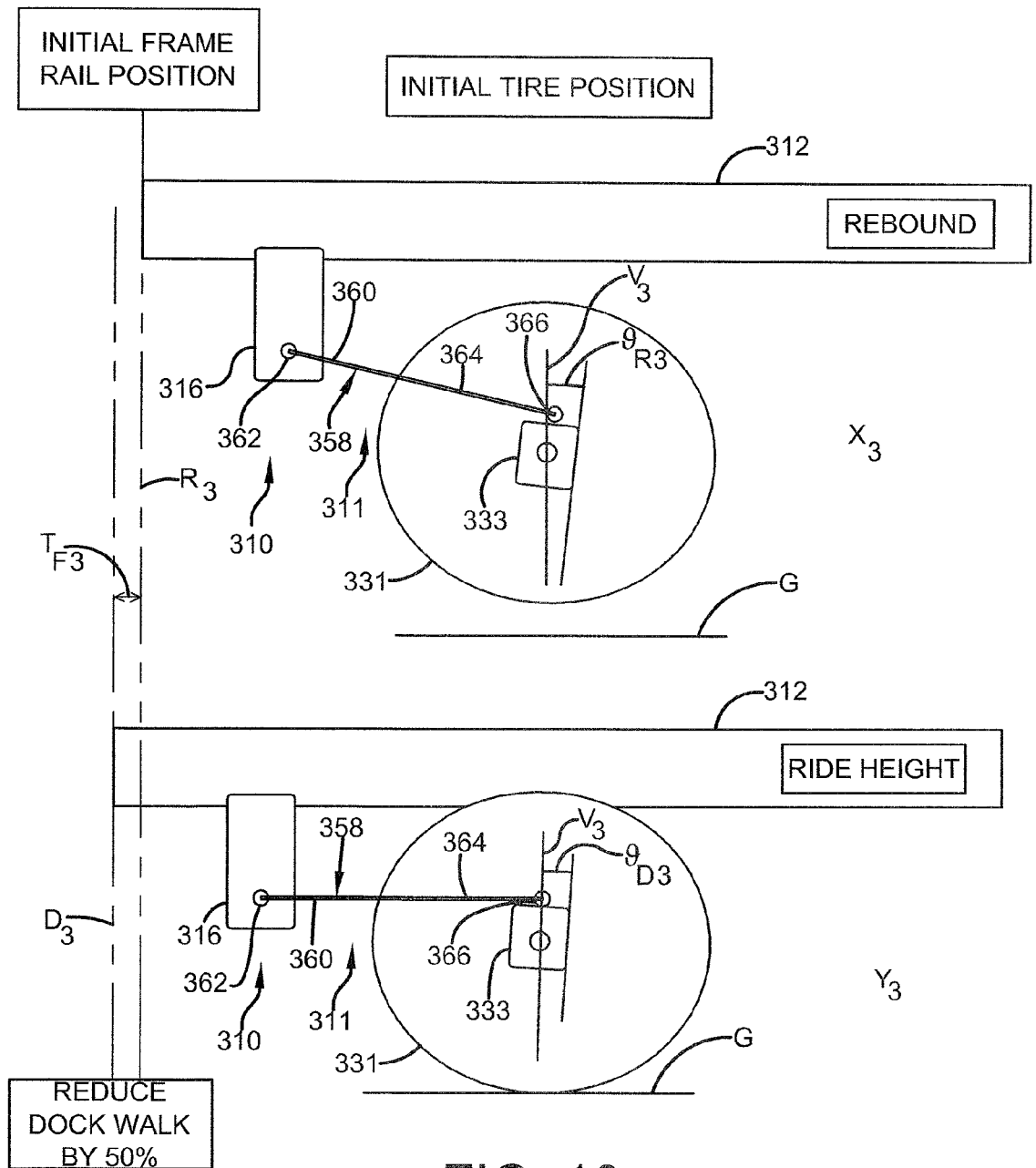
FIG. 10 is a fragmentary elevational schematic representation of the truck axle/suspension system incorporating the third preferred embodiment pneumatic control system of the present invention, showing the truck axle/suspension system during outrigger retraction where the vehicle is lowered from an axle/suspension rebound position to an axle/suspension system design ride height position, and illustrating reduced dock walk.

Turning to FIG. 10, a schematic representation of portions of an axle/suspension 310 that incorporates height control valve 334 (FIGS. 9, 9A, and 9B) is shown. Axle/suspension system 310 is generally identical to axle/suspension system 10 set forth above. However, for the sake of clarity and conciseness, only certain portions of axle/suspension system 310 will be described below. Axle/suspension system 310 includes a pair of suspension assemblies 311 (only portions of the driver-side assembly shown). For the sake of clarity and conciseness, only the driver-side suspension assembly 311 will be described, with the understanding that a generally identical curb-side suspension assembly is located on the other side of the vehicle. More specifically, suspension assembly 311 includes a longitudinal control member 358 is pivotally connected at a junction 362 to a hanger 316 at a front end 360 is shown. A rear end 364 of longitudinal control member 358 is pivotally connected at junction 366 to an axle housing 333. Longitudinal control member 358 extends a fixed length from hanger 316 to axle housing 333. For sake of completeness, hanger 316 is rigidly connected to a frame rail 312.

Having now described the structure of third embodiment pneumatic control system 335 of the present invention, and axle/suspension system 310 in which it is incorporated, the operation of the pneumatic control system during an outrigger operation will now be described in detail below.

During outrigger operations and other similar operations that completely extend air springs 324, air lock valve 350 is activated or energized into the "air lock on" position by the vehicle operator, as shown in FIG. 9A. When air lock valve 350 is in the "air lock on" position, alternate passage 353 of the air lock valve fluidly connects air springs 324 to blank cavity 336 via conduits 342 and 351. In this manner, the air volume of air springs 324 is locked and/or maintained such that potential damage to an at least one air bag 327 is prevented when height control valve 334 is in position C (FIG. 3) and air springs 324 of axle/suspension system 310 are completely extended and height control valve 334 is attempting to exhaust air from the air springs to return axle/suspension system 310 to design ride height. By retaining fluid in air springs 324 during an operation that causes such extension of the air springs rather than exhausting air as in prior art pneumatic control system 35, creation of a vacuum in air spring air bag 327 is prevented, which in turn prevents collapse of the air bag onto itself. Thus, when axle/suspension system 310 is lowered back onto the ground after operation of the outrigger or crane, air bag 327 will not become pinched or trapped and thus damage to air spring 324 may be prevented. In addition, re-inflation of air springs 324 will be unnecessary due to the presence of the retained air in the air springs.

More specifically, after the outrigger operation, or other operations that completely extend air springs 324, is completed, the heavy-duty vehicle is lowered until the outrigger is fully disengaged and wheels 331 of axle/suspension system 310 once again are in contact with the surface of the ground. Because the air volume in air springs 324 has been maintained by third embodiment pneumatic control system 335, once the vehicle is set back onto the ground, axle/suspension system 310 remains relatively close to the vehicle design ride height as a result of the locked air volume between blank 336 and air springs 324. The operator of the vehicle now deactivates air lock valve 350 returning it to the "air lock off" position, as shown in FIG. 9. When air lock valve 350 is in the "air lock off" position, passage 352 of the air lock valve fluidly connects air springs 324 to height control valve 334 via conduit 342. In this position, third preferred embodiment pneumatic control system 335 of the present invention resumes operation similar to prior art pneumatic control system 35 described above. Because the air volume is maintained in air springs 324 during the operation of the outrigger, only minimal re-inflation of the air springs is required to return the heavy-duty vehicle back to design ride height.

In addition, air lock valve 350 of third preferred embodiment pneumatic control system 335 of the present invention includes a dump feature. When the operator of the vehicle desires to deflate the air, or fluid, from air springs 324 during operation, the operator activates or energizes air lock valve 350 into the "dump" position shown in FIG. 9B, and fluid communication is allowed between air springs 324, through conduit 342, through dump passage 354, and through dump conduit 355 to atmosphere, thereby deflating the air springs. The "dump" feature may be desired when repairs need to be performed to suspension components and/or pneumatic system of the vehicle. The air is dumped, or exhausted, to obtain more vehicle stability, especially for unleveled surfaces.

As described above, during outrigger deployment/retraction operations air lock valve 350 is activated by the vehicle operator to the "air lock on" position, as shown in FIG. 9A.

As the vehicle is raised/lowered by the outriggers (not shown), an axle housing angle $\theta_3$, or pinion angle, changes as a result of the fixed distance of the longitudinal control member 358 relative to hanger 316 and the fixed nature of the axle clamp assembly (not shown). Axle housing angle $\theta_3$ is measured generally relative to a vertical line $V_3$ extending through the center of axle housing 333 and the rear wall of the axle housing. Axle housing angle $\theta_3$ exhibits two critical states based on the position of the axle/suspension system, a rebound angle $\theta_{R3}$, and a design ride height angle $\theta_{D3}$ As the vehicle is lowered by the outriggers, wheel 331 contacts ground G. The weight of the vehicle (not shown) causes axle/suspension system 310 to move from a rebound position $X_3$ to a design ride height position $Y_3$. More specifically, when wheels 331 comes into contact with ground G, longitudinal control member 358 and the axle clamp assembly pivot upwardly relative to hanger 316, the upward pivoting of the longitudinal control member in turn causes axle housing angle $\theta_3$ to change, which in turn causes the wheels to rotate in a counterclockwise direction along the ground surface. More particularly, axle housing angle $\theta_3$ changes from a rebound angle $\theta_{R3}$ to design ride height angle $\theta_{D3}$, which in turn causes wheels 331 to rotate as the axle housing angle changes. As a result, the vehicle moves from an axle/suspension system rebound rail position $R_3$ to an axle/suspension system design ride height rail position $D_3$, a distance of $T_{F3}$. The elimination of axle/suspension system jounce position Z (FIGS. 4A and 4B) is a result of the air volume maintained in air springs 324 by the fluid communication between the air springs and blank cavity 336 when air lock valve 350 is in the "air lock on" position (FIG. 9A). Additionally, distance $T_{F3}$, measured from $R_3$ to $D_3$, is generally about 50% less than $T_F$ (FIGS. 4A-4B) of the prior art. The minimization of the fore-aft movement of the vehicle during outrigger retraction operations generally minimizes potential stress and damage to the outrigger components and provides generally longer service life to the outrigger components.

The use of preferred embodiment pneumatic control systems 135,235,335 of the present invention minimizes damage to air bags 127,227,327 of air springs 124,224,324 when the air springs become extended during an event such as use of outriggers or lifting a trailer onto a rail flatbed, by allowing the operator of the vehicle to activate air lock valve 150,250,350 in order to maintain air volume in the air springs. As a result, air volume in air springs 124,224,324 is maintained to prevent pinching or trapping of air bags 127,227,327 of the air spring. Moreover, because the air volume is maintained in air springs 124,224,324 during the operation of the outrigger, or other similar such operation, only minimal re-inflation of the air springs is required to return the heavy-duty vehicle back to design ride height. In addition, maintenance of the air volume in the air springs 124,224,324 minimizes the fore-aft movement, or dock walk, during outrigger retraction operations minimizing potential stress and potential damage to the outrigger components and provides generally longer service life to the outrigger components.

It is contemplated that preferred embodiment pneumatic control systems 135,235,335 of the present invention may include alternate arrangements of the various components without changing the overall concept or operation of the present invention. It is further contemplated that other types of signals than those described hereinabove, such as manual activation, PTO, and body controller may be utilized to activate air lock valves 150,250,350 without changing the overall concept or operation of the present invention. It is even further contemplated that preferred embodiment pneumatic control systems 135,235,335 of the present invention may be utilized with different types of air-ride axle/suspension systems or different types of vehicles without changing the overall concept or operation of the present invention. It is further contemplated that other types of longitudinal control members, such as torque rods and the like, could be utilized without changing the overall concept or operation of the present invention. It is also contemplated that other types of valves having similar operations could be utilized with preferred embodiment pneumatic control systems 135,235, 335 without changing the overall concept or operation of the present invention.

Accordingly, the pneumatic control system for a heavy-duty vehicle of the present invention is simplified, provides an effective, safe, inexpensive and efficient structure and method which achieves all the enumerated objectives, provides for eliminating difficulties encountered with prior pneumatic control systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the pneumatic control system for a heavy-duty vehicle is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A pneumatic control system for a heavy-duty vehicle comprising:
   a) an air supply;
   b) a height control valve in fluid communication with said air supply and at least one air spring;
   c) an air lock valve in fluid communication with said height control valve and said at least one air spring, said air lock valve being in fluid communication with a blank cavity, the air lock valve having an "air lock off" position and an "air lock on" position;
   d) whereby, when said air lock valve is in said "air lock off" position, fluid flow is established between the height control valve, the air lock valve and the at least one air spring, and when the air lock valve is in said "air lock on" position, fluid flow is established between said at least one air spring, said air lock valve and said blank cavity, and fluid flow is prevented between said height control valve, the air lock valve and the at least one air spring.

2. The pneumatic control system for a heavy-duty vehicle of claim 1, wherein said air supply comprises an air tank.

3. The pneumatic control system for a heavy-duty vehicle of claim 1, wherein said height control valve is a three-way valve including a control arm, wherein the position of the arm controls the operation of the height control valve.

4. The pneumatic control system for a heavy-duty vehicle of claim 1, wherein said air lock valve is a three way two position valve.

5. The pneumatic control system for a heavy-duty vehicle of claim 4, wherein said air lock valve further comprises a first air passage and an alternate air passage, whereby when said air lock valve is in said "air lock off" position fluid flows between the height control valve and the air spring via said first air passage, and when said air lock valve is in said "air lock on" position fluid flows between the air spring and the blank cavity via the alternate air passage.

6. The pneumatic control system for a heavy-duty vehicle of claim 1, further comprising a means for actuating said air lock valve.

7. The pneumatic control system for a heavy-duty vehicle of claim 6, said means for actuating said air lock valve being a manual switch.

8. The pneumatic control system for a heavy-duty vehicle of claim 6, said means for actuating said air lock valve being an automated means that simultaneously actuates the air lock valve while actuating another process.

9. The pneumatic control system for a heavy-duty vehicle of claim 1, wherein said height control valve is also in fluid communication with atmosphere.

10. The pneumatic control system for a heavy-duty vehicle of claim 1, wherein said blank cavity is positioned separately from said height control valve.

11. The pneumatic control system for a heavy-duty vehicle of claim 1, said blank cavity being integrated into said height control valve.

12. The pneumatic control system for a heavy-duty vehicle of claim 1, wherein said air lock valve is also in fluid communication with atmosphere, and said air lock valve further comprises a "dump" position, whereby when the air lock valve is in said "dump" position, fluid flows from said at least one air spring to atmosphere.

13. The pneumatic control system for a heavy-duty vehicle of claim 12, wherein said air lock valve is a four-way, three-position valve.

14. The pneumatic control system for a heavy-duty vehicle of claim 1, wherein said at least one air spring comprises a pair of air springs.

15. The pneumatic control system for a heavy-duty vehicle of claim 6, said means for actuating said air lock valve being automatic.

\* \* \* \* \*